(12) United States Patent
Clapis et al.

(10) Patent No.: US 8,860,773 B2
(45) Date of Patent: Oct. 14, 2014

(54) TELEPRESENCE FOR REMOTE COLLABORATION WITH A GESTURAL INTERFACE

(71) Applicant: The MITRE Corporation, McLean, VA (US)

(72) Inventors: Joseph B. Clapis, Bedford, MA (US); Jeff Colombe, Washington, DC (US)

(73) Assignee: The MITRE Corporation, McLean, VA (US)

( * ) Notice: Subject to any disclaimer, the term of this patent is extended or adjusted under 35 U.S.C. 154(b) by 174 days.

(21) Appl. No.: 13/653,638

(22) Filed: Oct. 17, 2012

(65) Prior Publication Data

US 2014/0104363 A1   Apr. 17, 2014

(51) Int. Cl.
*H04N 7/15* (2006.01)

(52) U.S. Cl.
CPC ..................................... *H04N 7/15* (2013.01)
USPC ................... 348/14.03; 348/14.07; 348/14.08

(58) Field of Classification Search
CPC ......... H04N 7/14; H04N 7/141; H04N 7/142; H04N 7/147; H04N 7/148; H04N 7/15; H04N 7/152
USPC ................... 348/14.01–14.16, 586, 590, 582; 345/629, 619, 630, 634, 530; 382/162, 382/166
See application file for complete search history.

(56) References Cited

U.S. PATENT DOCUMENTS

| | | | |
|---|---|---|---|
| 6,023,302 A | 2/2000 | MacInnis et al. | |
| 6,369,830 B1 | 4/2002 | Brunner et al. | |
| 6,396,473 B1 | 5/2002 | Callahan et al. | |
| 6,421,460 B1 | 7/2002 | Hamburg | |
| 7,355,609 B1 | 4/2008 | Voas et al. | |
| 7,406,354 B2 | 7/2008 | Pearce et al. | |
| 7,978,204 B2 | 7/2011 | Ruge | |
| 2007/0040851 A1* | 2/2007 | Brunner et al. | 345/629 |
| 2009/0217210 A1 | 8/2009 | Zheng et al. | |
| 2013/0314421 A1* | 11/2013 | Kim | 345/427 |
| 2014/0063178 A1* | 3/2014 | Krans et al. | 348/14.08 |

OTHER PUBLICATIONS

Shotton, Jamie, et al., "Real-Time Human Pose Recognition in Parts from Single Depth Images," Jun. 6, 2011, 8 pages.
Tang, Matthew, "Recognizing Hand Gestures with Microsoft's Kinect," Stanford University, Department of Electrical Engineering, Mar. 16, 2011, 12 pages.

* cited by examiner

*Primary Examiner* — Melur Ramakrishnaiah
(74) *Attorney, Agent, or Firm* — Sterne, Kessler, Goldstein & Fox P.L.L.C.

(57) ABSTRACT

Methods, systems and computer-readable storage mediums encoded with computer programs executed by one or more processors for providing a telepresence with gestural interface for remote collaboration are disclosed. An electronic presentation including a background object and a foreground object is received. A real-time video of a presenter is received over a network for display within the electronic presentation. A layered presentation is composited. The layered presentation including the background object composited behind the opaque representation of the presenter composited behind the foreground object composited behind the translucent representation of the presenter. The layered presentation is provided for rendering in real-time.

21 Claims, 6 Drawing Sheets

TELEPRESENCE FOR REMOTE COLLABORATION WITH A GESTURAL INTERFACE

TECHNICAL FIELD

Embodiments herein relate generally to remote collaboration over a network.

BACKGROUND

With the advancement of technology and the increase in available bandwidth, teleconferencing systems have grown in popularity. Teleconferencing systems allow people, who may be located across various geographic locales, to communicate with each other over telecommunications networks. While some teleconferencing systems are limited to audio only, the increasing availability of bandwidth has allowed many others to offer both audio and video teleconferencing.

Often during a teleconference, there will be a main presenter who is moderating the discussion, or otherwise presenting the ideas or topic to be discussed via the teleconference. The presenter will often have an electronic presentation, including slides that are to be presented or discussed. Existing teleconferencing systems allow remote attendees to either see the electronic presentation and hear the audio of the presenter, or see the presenter while following along individually with either preprinted slides or a local copy of the electronic presentation displayed on a second screen and controlled locally.

BRIEF SUMMARY

Aspects of the subject matter described in this specification may be embodied in a computer-implemented method. As part of the method, an electronic presentation including a background object and a foreground object is received. A real-time video of a presenter is received over a network for display within the electronic presentation. A layered presentation, the background object composited behind the opaque representation of the presenter composited behind the foreground object composited behind the translucent representation of the presenter, is composited and provided for rendering in real-time at a remote device.

Other embodiments include corresponding systems, apparatus, and computer programs configured to perform the actions of the methods, encoded on computer storage devices. Further embodiments, features, and advantages, as well as the structure and operation of various embodiments, are described in detail below with reference to accompanying drawings.

BRIEF DESCRIPTION OF THE FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

While the present disclosure makes reference to illustrative embodiments for particular applications, it should be understood that embodiments are not limited thereto. Other embodiments are possible, and modifications can be made to the embodiments within the spirit and scope of the teachings herein, and additional fields in which the embodiments would be of significant utility. Further, when a particular feature, structure, or characteristic is described in connection with an embodiment, it is submitted that it is within the knowledge of one skilled in the relevant art to affect such feature, structure, or characteristic in connection with other embodiments whether or not explicitly described.

Teleconferences and other forms of remote collaboration are useful in allowing people who are not geographically located near one another to come together to share and discuss ideas over a network. However, conventional teleconference systems are not without their limitations, especially when an attendee or presenter wants to discuss an electronic presentation, such as one or more slides or images. Conventional teleconference systems often require remote attendees to choose between using a single screen or dual screens to view the electronic presentation.

With the single screen option, remote users must often choose between seeing the presenter or the presentation, but not both. For example, if remote users are viewing the electronic presentation, then often they may only be able to hear the audio of the presenter. Or, if remote users are viewing the presenter, often they will require a local preprinted copy of the presentation. In a dual screen scenario, a remote user may have a local copy of the electronic presentation on one screen, and streaming video/audio of the presenter on another screen. However, this too is an imperfect solution because not only is additional hardware (e.g., multiple screens and additional bandwidth) required, but also it can become tedious for users to choose between looking at the screen with the presenter or the screen with the presentation.

Figure 1:
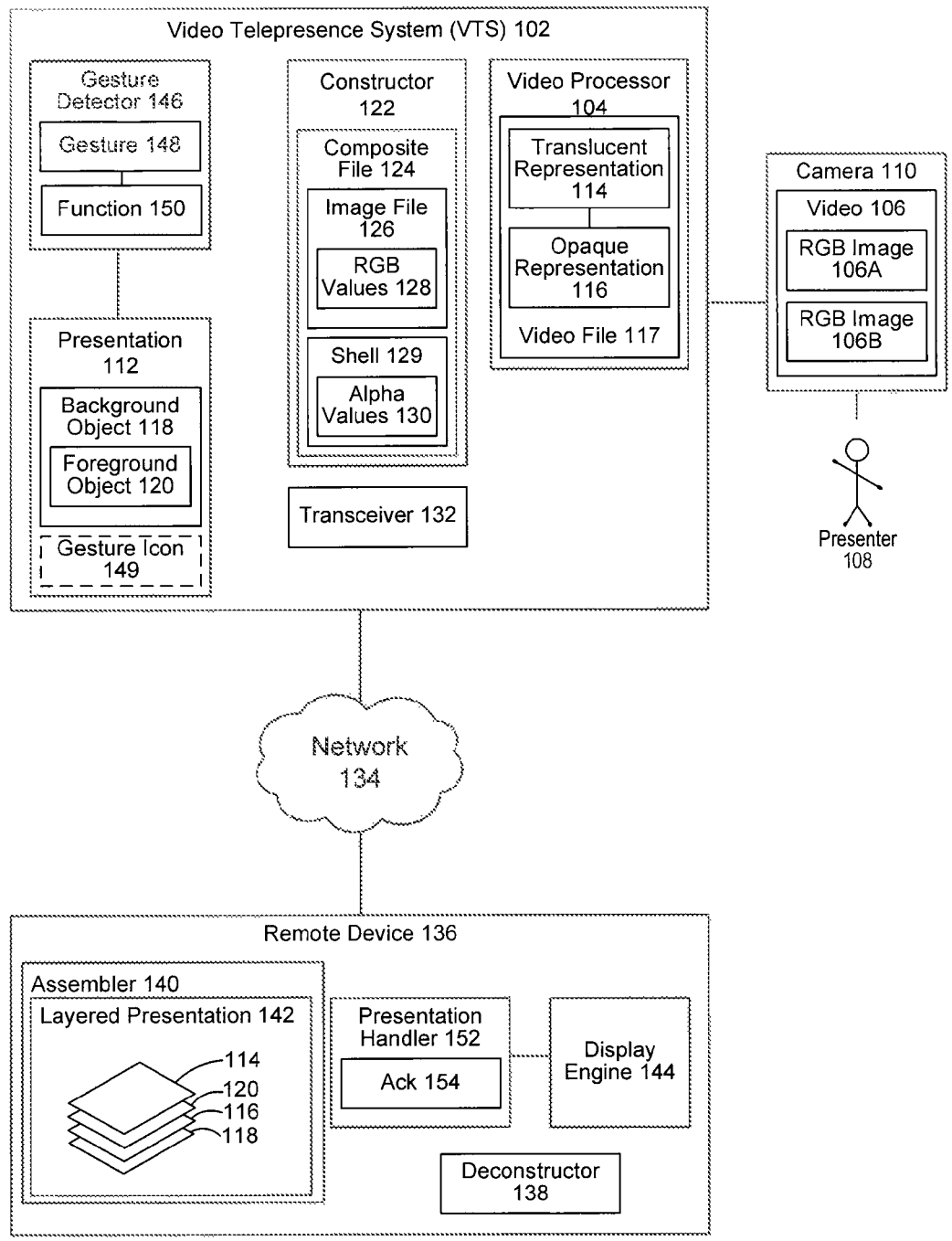
FIG. 1 is a block diagram illustrating a system 100 for providing a telepresence for remote collaboration with a gestural interface, according to an embodiment.

FIG. 1 is a block diagram illustrating a system 100 for providing a telepresence for remote collaboration with a gestural interface, according to an embodiment. System 100 includes a video telepresence system (VTS) 102 that allows a presenter 108 of an electronic presentation 112 (e.g., presentation 112) to be seen within the scope or context of the presentation. VTS 102 allows an image of presenter 108 to be transmit over a network 134, in real-time, rendered within the context or boundaries of presentation 112 at a remote device 136, using only a single screen or display at remote device 136. VTS 102 allows for programmatic video integration of images or video of presenter 108 within the same screen of presentation 112. VTS 102 further provides a gestural interface, by way of a gesture detector 146, that further allows presenter 108 to control presentation 112 using various gestures 148 that correspond to functions 150 associated with controlling presentation 112.

VTS 102 allows for a single screen to be used to display both real-time video 106 of presenter 108 integrated with presentation 112 at one or more remote devices 136 communicatively coupled to VTS 102 over network 134. VTS 102 further provides for a touchless gestural interface by which presenter 108 can control presentation 112 both locally and remotely (i.e., as appearing on remote device 136) using only various gestures 148 (rather than using a remote control or mouse, as used with conventional teleconferencing systems). In another embodiment however, traditional means of changing presentation 112, such as using a mouse or remote control, may be used.

A video processor 104 receives video 106 of presenter 108 from a camera 110. Presenter 108 may be a person (or persons) who is presenting or discussing presentation 112 during a teleconference or other remote collaboration. Video 106 may be a digital video or series of images of presenter 108 as captured by camera 110.

Though the example embodiment of a presenter 108 and presentation 112 is described herein, it is understood by those skilled in the art that the present disclosure is applicable to a wider array of uses, whereby a presenter 108 and presentation 112 is only one exemplary embodiment. Presentation 112, in other embodiments, may be any application, including but not limited to a presentation program. For example, presentation 112 may be a game, word processing or spreadsheet application, browser and/or website, or other network application. Presenter 108 may or may not be discussing topics directly related to that which is displayed on presentation 112.

Camera 110 may be a video camera, web cam, or other image capture device capable of capturing video and audio of presenter 108 as video 106. In an embodiment, camera 110 may only capture video images of presenter 108 while a microphone (not shown) or other audio capture device may capture audio of presenter 108. For purposes of this description, video 106 is presumed to include both audio and video of presenter 108.

In an embodiment, camera 110 may not only capture video 106, but may also perform additional processing on video 106, such as identifying, or cropping video of presenter 108 from the background of the video. For example, presenter 108 may be presenting from an office or boardroom. In an embodiment, camera 110 may be able to distinguish presenter 108 from the background of video (e.g., the office or boardroom, including tables, chairs, etc.), and may provide the video of presenter 108 (without the background images/objects) as video 106 to video processor 104. Video processor 104 may then perform additional processing, if necessary, to further refine the provided video 106.

Video processor 104 may receive video 106 and determine translucent representation 114 and opaque representation 116 of presenter 108. Translucent representation 114 may be a video, image or other representation of presenter 108 in which objects that are placed behind translucent representation 114 may be fully or at least partially visible. For example, if an image of a car appears in a video behind translucent representation 114 of a hand of presenter 108, then the portion of the car occluded by translucent representation 114 may nonetheless be at least partially visible through translucent representation 114. In an embodiment, translucent representation 114 may include a solid or opaque outline of the hand and/or a slight color distortion or alpha blending to indicate that translucent representation 114 exists in front of the occluded portion of the car. As just referenced, translucent representation 114 may be blended (e.g., alpha-blended) with images or video of whatever is appearing behind translucent representation 114.

Opaque representation 116 may be a video, image or other representation of presenter 108 such that when objects appear behind opaque representation 116, those objects may not be visible (or otherwise less visible than if appearing only behind translucent representation 114). In an embodiment, objects appearing behind opaque representation 116 may be partially visible, but less visible than the same object appearing only behind translucent representation 114. Both translucent representation 114 and opaque representation 116 may be associated with alpha values 130.

Alpha values 130 may indicate a level of transparency of an image. For example, in embodiment, alpha values may range from 0 (completely translucent) to 255 (fully opaque), in which an image may be set to 255 as a default value. In an embodiment, alpha value 130 for opaque representation 116 may be set to 215 or 255, while translucent representation 114 may be any alpha value 130 less than that of opaque representation 215, such as 80 or 0. Alpha values 130 may be set on a per-pixel level, such that different pixels within a particular image may have different alpha values 130.

Translucent representation 114 may be overlaid on top of opaque representation 116 when rendered on remote device 136. This overlay may allow representations 114, 116 to appear as a single opaque video or representation of presenter 108 when displayed. During a playing of video, translucent representation 114 and opaque representation 116 will always appear/move in tandem and overlap one another. As will be discussed in greater detail below, only when an object appears in front of opaque representation 116 and behind translucent representation 114 will translucent representation 114 be visible to a user or remote attendee viewing a presentation (e.g., layered presentation 142) at remote device 136.

In an embodiment, video 106 may include a RGB image 106A and a depth image 106B. RGB image 106A may include color values (e.g., RGB values 128) for video 106 captured by camera 110. Depth image 106B may include depth values (e.g., depth buffer or Z-buffer values) that contain information relating to the distance of the surfaces of scene objects from a viewpoint (i.e., camera 110).

Then, for example, video processor 104 may generate a video file 117 from RGB image 106A and depth image 106B as captured or otherwise provided by camera 110. Video file 117 may include values for both opaque representation 116 and translucent representation 114. For example, video file 117 may be a BGRA (blue, green, red, alpha) image file that includes both RGB values 128 and alpha values 130 within a single image or video.

Presentation 112 may include both one or more background objects 118 and one or more foreground objects 120. Background object 118 may be any background of presentation 112. Background object 118 may be a solid color, an image, a pattern, a logo, or other graphic appearing in the background of presentation 112. Background object 118 may be constant throughout presentation 112, or presentation 112 may include multiple background objects 118 that may vary depending on which slide is being presented.

Foreground object 120 may be any object(s) that are visible ahead of background object 118. Foreground object 120 may include images, text, video, animations, multimedia, or other visible objects of presentation 112. Often, during a design of presentation 112, background object 118 will be selected, and text/images will be placed on top of background object 118, such that foreground objects 120 (e.g., the selected text/images) are visible ahead of portions of background object 118. Presenter 108 will often refer to or discuss foreground objects 120 during a teleconference or remote collaboration. There may be slides or portions of presentation 112 that only include one of background object 118 or foreground object 120.

In an embodiment, presentation 112 may include layers, such that certain objects are placed on top of or in front of other objects. VTS 102 may determine that those objects that are placed behind all other objects are background objects 118, while other objects placed in front of background objects 118 may be foreground objects 120. In an embodiment, presentation 112 may include more than two layers of objects, for example, other objects may appear in front of background objects 118 but behind foreground objects 120. These intermediary objects may be classified as either background objects 118 or foreground objects 120, depending on their context or use within presentation 112. In another embodiment, a user may identify, select, or adjust which object(s) or portion(s) of presentation 112 are to be considered background objects 118 and foreground objects 120.

A constructor 122 compresses or composites translucent representation 114 with opaque representation 118 into a composite file 124. In an embodiment, constructor 122 may extract, compute, or otherwise determine RGB values 128 and alpha values 130 from video file 117. Constructor 122 may create a first image file 126 including RGB values 128, and a shell 129 of image file 126 including alpha values 130 and other presentation values.

RGB values 128 may be values (e.g., such as pixel values) used for rendering opaque representation 116 and translucent representation 114. RGB values 128 include values necessary for rendering presenter 108 on a display screen or monitor. RGB values 128 may vary across various embodiments to account for the technical capabilities of a particular display device and/or camera 110 used. In an embodiment, multiple versions of image file 126 may be created with varying RGB values 128, which may vary depending on which remote device 136 is going to receive composite file 124. For example, a mobile phone or tablet remote device 136 may receive a different composite file 124 than a desktop or laptop computer.

RGB values 128 may include red, green, and blue values of pixels on a screen. For example, each RGB value 128 may include an indication of how much red, green, and blue should be used to create the color of a particular pixel or other display element on a display device.

As referenced above, constructor 122 may also create or generate shell 129 of image file 126 without RGB values 128. For example, constructor 122 may create a copy of image file 126 and strip away RGB values 128, thus creating shell 129. Using shell 129, constructor 122 may include or save alpha values 130 for rendering translucent representation 114.

Alpha values 130, as referenced above, may indicate the translucency, transparency, or opaqueness of the corresponding RGB values 128. In an embodiment, alpha values 130 may be provided as a percentage indicating how transparent the RGB values 128 of the opaque representation 116 are to be in order to render the translucent representation 114. For example, 0% may indicate may indicate complete transparency, while 100% may indicate a fully opaque image. In other embodiments, alpha values 130 may be represented as integer values, or real values between 0 and 1.

In an embodiment, shell 129 may have three channels available, corresponding to the R, G, and B values 128. Constructor 122 may include alpha values 130 in one of the channels, for example the R channel. Constructor 122 may then store additional presentation values in the remaining two channels of shell 129. Other possible presentation values related to adjusting the video display that may be included with shell 129 include depth, sharpness, and hue values.

Constructor 122 may compress or vertically composite image file 126 (with RGB values 128) and shell 129 (with alpha values 130 and other optional presentation values) into a composite file 124. Constructor 122 may use any known algorithm by which to compress or composite image files 126 and 128. In an embodiment, composite file 124 may be generated by compressor 122 such that it is determinable which alpha values 130 correspond to which RGB values 128 for the regeneration of translucent representation 114. Composite file 124 may be in any known image or video compression format, capable of transmitting video 106 over network 134.

A transceiver 132 may transmit composite file 124 over network 134 to remote device 136. Transceiver 132 may be a modem, port, antenna, program, or other device or program that can communicate wirelessly or wired with one or more remote devices 136 over network 134. Transceiver 132 may send presentation 112 and composite file 124 over network 134 to remote device 136. Transceiver 132 may also receive communications over network 134 from one or more remote devices 134.

Network 134 may be any telecommunications (wired or wireless) network allowing for communications between VTS 102 and remote device 136. In an embodiment, network 134 may be the Internet or a private intranet.

Remote device 136 may be any computing device communicatively coupled to VTS 102 over one or more networks 134. Remote device 136 may receive composite file 124 and presentation 112 from VTS 102 over network 134. In an embodiment, multiple varying remote devices 136, including laptops, desktops, tablets, mobile phones, or other computing devices, may be communicatively coupled to VTS 102 and receiving composite file 124.

A deconstructor 138 may decompress or decomposite composite file 124 to determine RGB values 128 and alpha values 130 from image file 126 and shell 129, respectively. Conventional teleconferencing systems may include RBG values 128, but will not provide any additional presentation values, such as alpha values 130.

Deconstructor 138 may be programmed with information indicating that composite file 124 includes both image file 126 (with RGB values 128) and shell 129 (with alpha values 130). Using a decompression or deconstruction algorithm (corresponding to the algorithm used by constructor 122), deconstructor 138 deconstructs composite file 124 to extract RGB values 128 and alpha values 130 for rendering opaque representation 116 and translucent representation 114 of presenter 108. In an embodiment, deconstructor 138 may provide opaque representation 116 and translucent representation 114 or RGB values 128 and alpha values 130 to assembler 140 for assembly into a layered presentation 142.

Assembler 140 may assemble or composite layered presentation 142. Layered presentation 142 may include a composited presentation including presentation 112 and video 106 of presenter 108. As referenced above, the composited or layered presentation 142 may be displayed on a single screen, in which presenter 108 and presentation 112 are both visible.

Assembler 140 may composite or layer opaque representation 116, translucent representation 114, foreground objects 120, and background objects 118 into a single layered presentation 112. Layered presentation 142 is a video or image of presenter 108 rendered within the context or bounds of presentation 112 for remote attendees viewing a display screen at remote device 136. In an embodiment, layered presentation 142 may include the four layers composited together. Assembler 140 may composite background object 118 into layered presentation 142. Assembler 140 may also composite opaque representation 116 in front of background object 118, foreground object 120 in front of opaque representation 116, and translucent representation 114 in front of foreground object 120.

The resultant layered presentation 142, as assembled or composited by assembler 140, may then be provided for display by a display engine 144. Layered presentation 142 may include both presenter 108 and presentation 112 composited together, such that presenter 108 does not occlude or block any important features (e.g., foreground objects 120) of presentation 112, and that foreground objects 120 are visible no matter where on the screen presenter 108 (e.g., translucent representation 114 and opaque representation 116) may be displayed.

For example, if presenter 108 is moving while speaking, translucent representation 114 and opaque presentation 116 may in tandem track presenter's 108 movements within layered presentation 142. Then, for example, if the image or video of presenter 108 (or a portion thereof, such as the presenter's hand or head) moves in front of a foreground object 120 within layered presentation 148, translucent representation 114 will be visible ahead of foreground object 120. Foreground object 120 however may block a corresponding portion of opaque representation 116. As such, the video of presenter 108 may include a partially translucent representation 114 appearing in front of one or more foreground objects 120, and a partially opaque representation 116 appearing in front of background object 118. Given the translucent nature of representation 114, foreground object 120 may nonetheless be visible (or partially visible) through translucent representation 114, for those portions of presenter 108 that may be in front of a foreground object 120. As for those portions of presenter 108 not blocking a foreground object 120, opaque representation 118 may remain fully visible, while other portions of opaque representation 118 may be completely occluded by the foreground object 120.

Contrary to conventional teleconferencing systems, in an embodiment, assembler 140 composites layered presentation 142 at remote device 136, rather than being composited with presentation 112 prior to transmission. Though in other embodiments, compositing may be performed by VTS 102 or another system before transmission to remote device 136.

VTS 102 may allow for a real-time streaming and viewing of layered presentation 142 at remote device 136. Without performing additional processing while rendering layered presentation 142, system 100 allows both presenter 108 and presentation 112 to be displayed in a single screen at remote device 136 without the occlusion of key elements or foreground objects 120 of presentation 112. For example, as referenced above, if presenter 108 moves in front of foreground object 120, translucent representation 114 of layered representation 142 will automatically become visible ahead of foreground objects 120 without requiring any additional real-time or client-side processing to determine whether foreground object 120 and presenter 108 overlap.

System 100 allows for a real-time, client-side compositing of video 106 of presenter 108 with an electronic presentation 112. For example, video 106 may be streaming to VTS 102 (e.g., from camera 110 or over another network 134), and in real-time, video processor 104 may process video 106, and provide translucent representation 114 and opaque representation 116 to remote device 136 for composition with presentation 112. In an embodiment, remote device 136 may include a local copy of presentation 112, including identified background object 118 and foreground object 120. In another embodiment, VTS 102 may stream or provide presentation 112 over network 134 to remote device 136.

Display engine 144 may then display layered presentation 142 on a monitor, touchscreen, or other display device. Or, for example, display engine 144 may provide layered presentation 142 to multiple output devices across one or more additional networks 134.

Gestural Interface

VTS 102 may include a gesture detector 146 that controls presentation 112. Gesture detector 146 may detect gestures 148 as performed by presenter 108 during the course of a presentation (e.g., video 106) that corresponding to functions 150 that operate or change presentation 112. A function 150, when executed, may cause presentation 112 to move forward a slide, move backward a slide, start/pause an animation, change the volume, type a word/letter, or perform any other function compatible with presentation 112.

Gestures 148 may be actions performed by presenter 108 that correspond to functions 150. Gestures 148 may include any movement or combination of movements that may be performed by presenter 108 that are associated with functions 150 of presentation 112. Example gestures 148 may include presenter 108 moving a particular finger in a particular direction, making a hand motion, performing a kick, or other gesture or movement.

In an example of using the gestural interface, presenter 108 may be discussing a particular slide from presentation 112. Upon completing the discussion on the current slide, presenter 108 may desire to scroll to the next slide. In an embodiment, presenter 108 may select a gesture icon 149 that appears on presentation 112 to indicate a function 150 is to be performed. The selection of gesture icon 149 may involve presenter 108 moving his/her hand towards a portion of a display (showing presenter 108 in association with presentation 112) that includes gesture icon 149, and moving a finger indicating a selection of gesture icon 149.

Gesture icon 149 may be any virtual or visual indication appearing on presentation 112 that indicates presenter 108 is about perform a gesture 148 to change presentation 112. Requiring the selection of gesture icon 149 may prevent gesture detector 146 from recording or detecting unintended gestures 148 by presenter 108 that may have not been intended to activate functions 150. In another embodiment however, presentation 112 may not have gesture icon 149, or a particular or unique gesture 148 may correspond to a virtual activation of gesture icon 149 without an actual icon being displayed with presentation 112.

Upon activation of gesture detector 148, VTS 102 may present the sequence of slides corresponding to presentation 112 on a screen being viewed by presenter 108. Presenter 108 may then perform various gestures 148 to scroll to previous slides, scroll to later slides, select a particular slide, or perform other functions 150. Gesture detector 146 will detect when presenter 108 performs a valid gesture 148 that corresponds to a function 150, and activate or otherwise signal that function 150 is to be activated.

Upon detection of a function 150 by gesture detector 146, transceiver 132 may also transmit the detected function 150 to remote device 136, such that layered presentation 142 may be updated as well. A presentation handler 152 may receive function 150 and perform or otherwise cause the corresponding function 150 to be performed on presentation 112, which would then be included in layered presentation 148 by assembler 140 in real-time. Display engine 144 may then display the updated layered presentation 148. In an embodiment, presentation handler 152 may then return an acknowledgement (ack) 154 to VTS 102 confirming that the selected function 150 has been received and/or layered presentation 142 has been updated.

Ack 154 may allow remote device 136 to communicate with VTS 102 and ensure that presentation 112 as included in layered presentation 142 is displaying the same image/object as is being seen by presenter 108 and as is displayed on presentation 112 at VTS 102. For example, each time presenter 108 performs a gesture 148 to change presentation 112, a corresponding function 150 may be provided to remote device 136. Presentation handler 152 may then update presentation 112 for layered presentation 142 accordingly, and return ack 154 over network 134.

In an embodiment, presenter 108 may be notified when ack 154 is received (e.g., by an on-screen notification), or otherwise may be notified if ack 154 is not received within a particular time interval (e.g., five seconds) from when gesture 148 is detected. Presenter 108 may then address the issue and request a remote attendee to manually change presentation 112 according to the previously selected function 150 for which ack 154 was not received. In an embodiment, other periodic handshaking or communication could occur between VTS 102 and remote device 136 to ensure presentation 112 appears the same on both devices of network 134.

Figure 2:
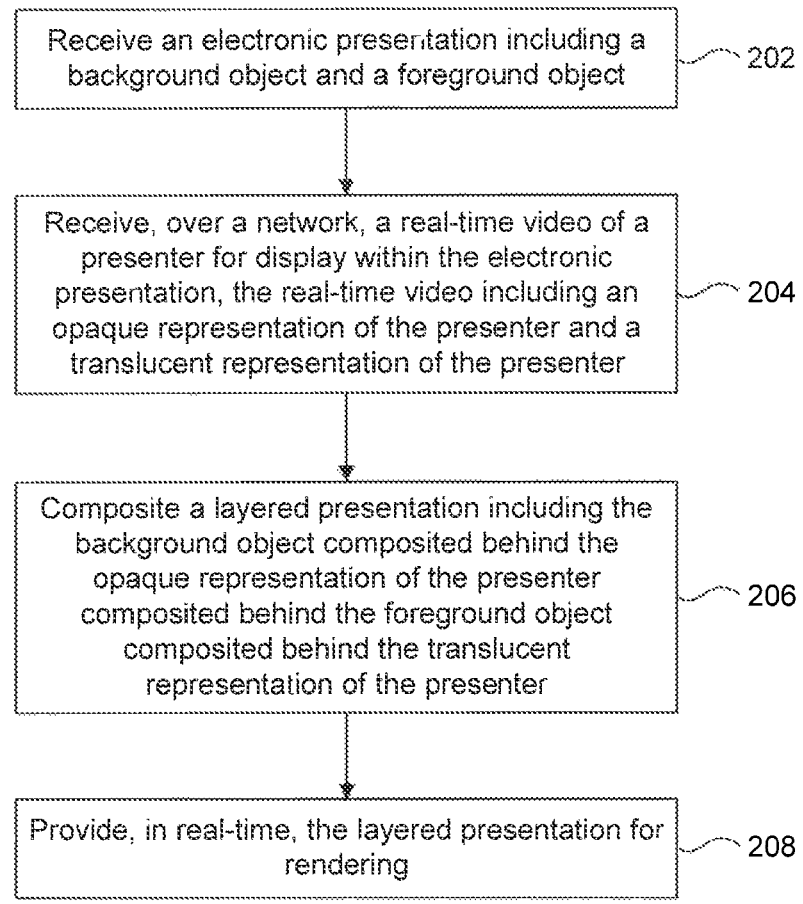
FIG. 2 is a flow chart of a process for providing a telepresence for remote collaboration with a gestural interface, according to an embodiment.

FIG. 2 is a flow chart of a process for providing a telepresence for remote collaboration with a gestural interface, according to an embodiment. The stages of FIG. 2 are described below, in non-limiting examples, with reference to FIG. 1.

At stage 202, an electronic presentation including a background object and a foreground object are received. For example, remote device 136 may receive presentation 112 over network 134. In an embodiment, presentation 112 may be received prior to receipt of video 106, or in conjunction therewith. Presentation 112 may include foreground objects 120 such as text and images placed on top of a background object 118 or wallpaper.

At stage 204, a real-time video of a presenter is received over a network for display within the electronic presentation. The real-time video includes an opaque representation of the presenter and a translucent representation of the presenter. For example, remote device 136 may receive composite file 124 corresponding to video 106 over network 134 in real-time as presenter 108 is presenting, moving, or talking in front of camera 110. There may be a transmission and processing delay that occurs between the time presenter 108 performs an action, and the time composite file 124 including that action is received by remote device 136. Deconstructor 138 may then decompress composite file 124 to extract translucent representation 114 and opaque representation 116.

At stage 206, a layered presentation is composited. The layered presentation includes the background object composited behind the opaque representation of the presenter composited behind the foreground object composited behind the translucent representation of the presenter. For example, assembler 140 may assemble or composite translucent representation 114 on top of foreground object 120, which is on top of opaque representation 116, which is on top of background object 118 into a cohesive video or image for display at remote device 136. This compositing may be done in real-time.

At stage 208, the layered presentation is provided, in real-time, for rendering. For example, display engine 144 may display layered presentation 142, and any updates received by presentation handler 152 corresponding to functions 150.

Figure 3:
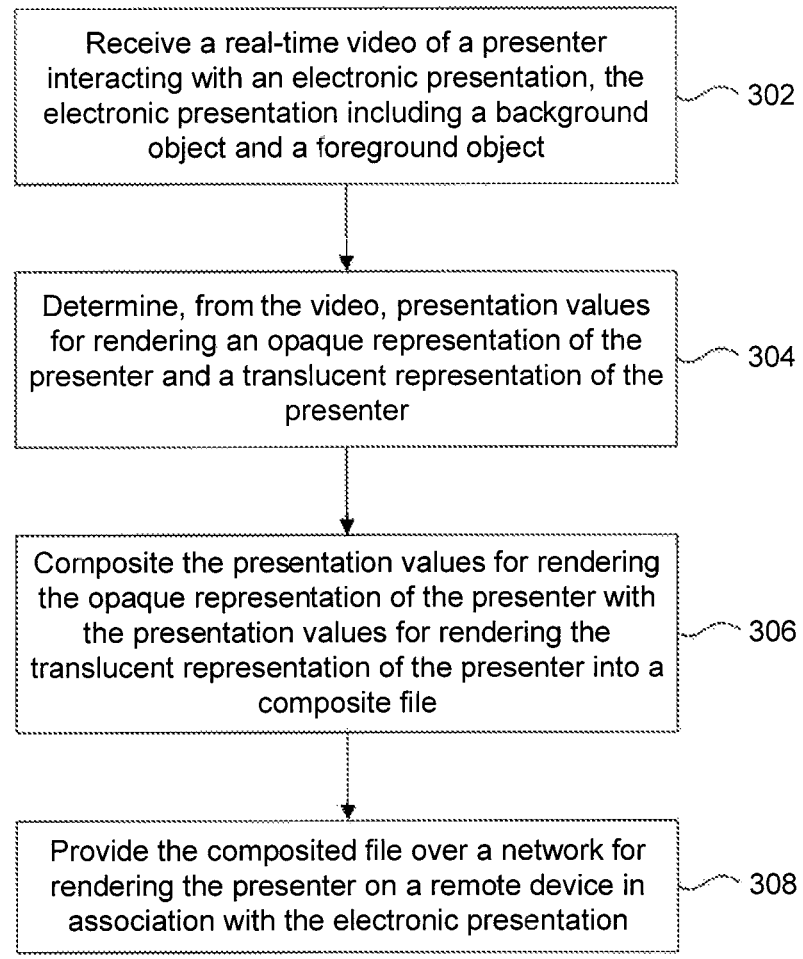
FIG. 3 is a flow chart of a process for providing a telepresence for remote collaboration with a gestural interface, according to another example embodiment.

FIG. 3 is a flow chart of a process for providing a telepresence for remote collaboration with a gestural interface, according to another example embodiment. The stages of FIG. 3 are described below, in non-limiting examples, with reference to FIG. 1.

At stage 302, a real-time video of a presenter interacting with an electronic presentation is received. The electronic presentation includes a background object and a foreground object. For example, video processor 104 may receive video 106 of presenter 108 giving a presentation (e.g., talking, moving, pointing) in front of camera 110. Presenter 108 may be discussing presentation 112, which includes foreground objects 120 (which may be discussed by presenter 108) and a background object 118 or wallpaper.

At stage 304, presentation values for rendering an opaque representation of the presenter and a translucent representation of the presenter are determined from the video. For example, video processor 104 may receive video 106 of only presenter 108, without any background images or objects. Video processor 104 may then refine the video quality, if necessary, and generate a translucent representation 114 from video 106. Video 106 may already include opaque representation 116, which may be the default mode for video 106. As such, video processor 104 may apply particular alpha values 130 to generate translucent representation 114.

At stage 306, the presentation values for rendering the opaque representation of the presenter with the presentation values for rendering the translucent representation of the presenter are composited into a composite file. For example, constructor 122 may generate composite file 124 including both image file 126 and shell 129. Image file 126 may include RGB values 128 corresponding to RGB image 106A. Constructor 122 may then generate a copy or shell of 129 of image file 126, extract RGB values 128, and provide alpha values 130 (as determined from video file 117) instead. Constructor 122 may then compress or composite image file 126 and shell 129 into composite file 124. In an example embodiment, shell 129 may include additional presentation values as well, including but not limited to alpha values 130.

At stage 308, the composited file is provided over a network for rendering the presenter on a remote device in association with the electronic presentation. For example, transceiver 132 may continuously send composite files 124 corresponding to video file 117 over network 134 to remote device 136.

Figure 4:
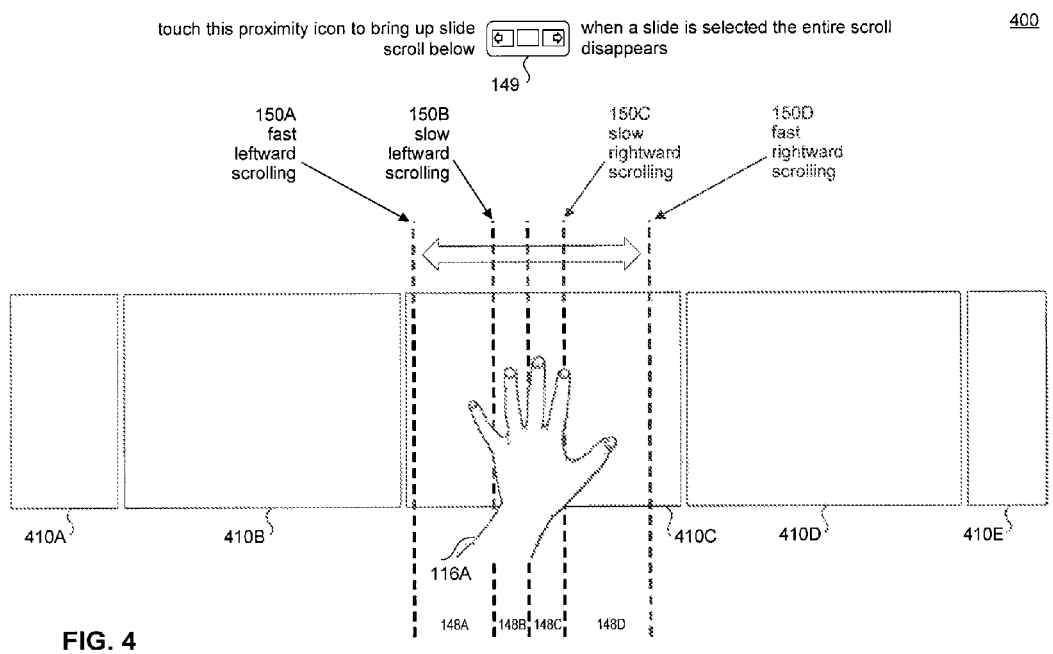
FIG. 4 is a diagram illustrating the gestural interface, according to an embodiment.

FIG. 4 is a diagram illustrating the gestural interface 400, according to an embodiment. An example gesture icon 149 is shown. Upon selection of gesture icon 149, presenter 108 may be presented with gestural interface 400.

An opaque representation of the presenter's hand 116A may be visible, and act as a control by which presenter 108 may control the interface 400. In other embodiments, a translucent representation 114 of presenter's hand may be used, or other icons, such as an arrow, circle, or other image, representing a pointer may be used.

A number of slides 410A-410E may be visible from presentation 112. Though details of each slide 410A-410E are not visible in interface 400, other embodiments may include full or partial details of foreground and/or background objects 120, 118 in the slides.

Example gestures 148 A-D are shown. Each of gestures 148A-D may correspond to the listed function 150A-D. For example, gesture 148A may involve presenter 108 moving his/her pinky or hand left, in which case, function 150A fast leftward scrolling may be activated.

Upon performing a particular function 150, or after a predetermined period of time, or otherwise upon receiving an indication from presenter 108 (such as selecting gesture icon 149 again), gestural interface 400 may disappear and be replaced with the selected slide 410.

Figure 5:
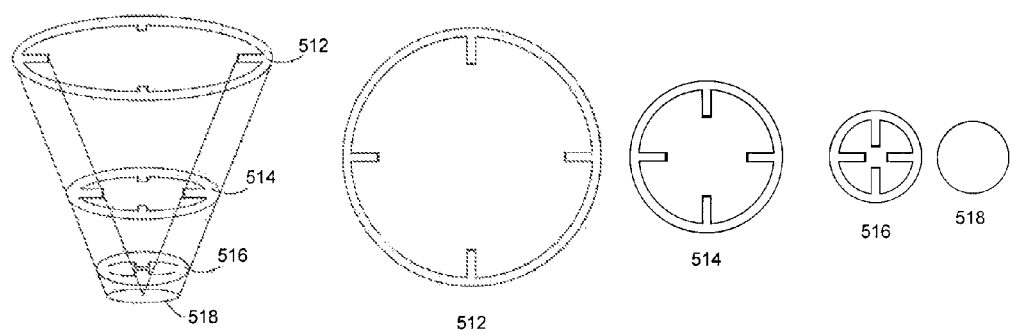
FIG. 5 is a diagram illustrating the gestural interface, according to another embodiment.

FIG. 5 is a diagram illustrating the gestural interface 500, according to another embodiment. As referenced above, presenter 108 may select items from presentation 112 (such as gesture icon 149) using only gestures 148. However, as presenter 108 may be moving around while speaking, presenter's 108 distance from camera 110 may vary as well. If presenter 108 is too far away from camera 110, presenter 108 may not be able to make a selection of an item from presentation 112. Similarly, if presenter 108 is positioned too close to camera 110, presenter 108 may need to move further away from camera 110 prior to make a selection.

Gestural interface 500 includes example indicators 512, 514, 516, and 518 that may indicate to presenter 108 whether presenter 108 needs to be closer or further away from camera 110 to make a selection of an item from presentation 112 (such as a "play" button for activating a video). In an embodiment, presenter 108 may see indicators 512-518 on a screen displaying presentation 112 after selecting gesture icon 149. In another embodiment, presenter 108 may see indicators 512-518 when trying to select gesture icon 149.

Indicators 512-518 may indicate to presenter 108 whether presenter 108 is too close or too far away from camera 110 in order to make a selection or perform a gesture 108. For example, indicator 512 may indicate that presenter 108 is too close to camera 110 to make a selection. When presenter 108 is too close to camera 110, it may be difficult for VTS 102 to accurately determine which area of presentation 112 or a screen presenter 108 is trying to select because presenter's 108 hand may take up too big an area of presentation 112 to accurately select a single item. Indicator 514, similarly may indicate that presenter 108 is further away from camera 110, but still too close to make a selection.

Indicator 516 may indicate that presenter 108 is positioned at a good or proper distance from camera 110 and able to make a selection. When indicator 516 is displayed, presenter 108 may select whatever icon or item is behind indicator 516 on presentation 112. Indicator 518 may indicate that presenter 108 is too far away from camera 118 to make a selection, and must move closer to camera 110.

In an embodiment, indicators 512-518 may include other visual indicators or variances that indicate whether presenter 108 is able to make a selection. For example, indicators 512-518 may change shapes, colors, or may include alphanumeric labels that change as well.

Figure 6:
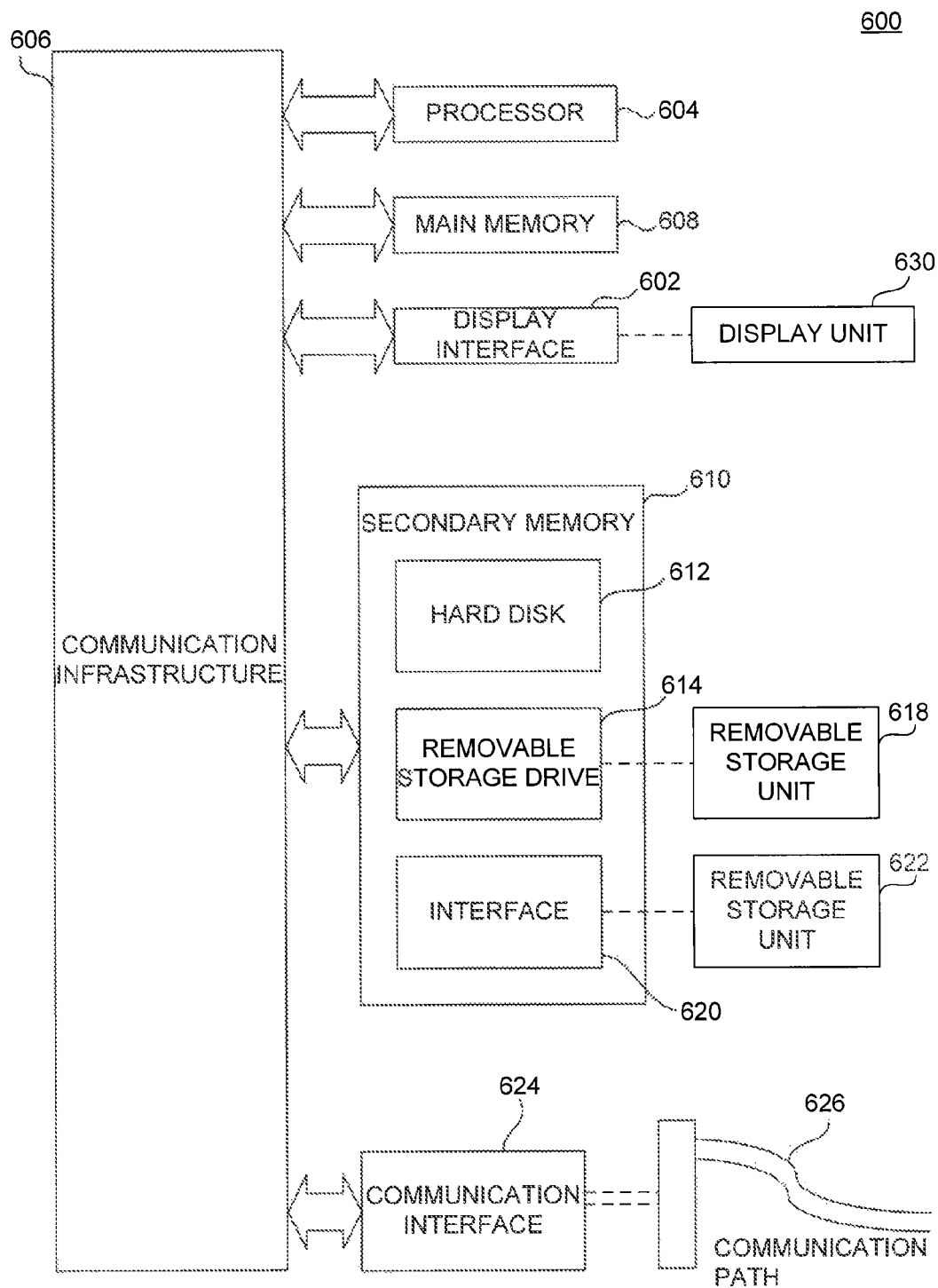
FIG. 6 is an example system diagram that can be used to embody or implement embodiments described herein.

FIG. 6 illustrates an example computer system 600 in which embodiments as described herein, or portions thereof, may be implemented as computer-readable code. For example, VTS 102, remote device 136, and methods 200 and 300, including portions thereof, may be implemented in computer system 600 using hardware, software, firmware, tangible computer readable media having instructions stored thereon, or a combination thereof and may be implemented in one or more computer systems or other processing systems. If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. The memory may include any non-transitory memory. A processor device may be a single processor, a plurality of processors, or combinations thereof. Processor devices may have one or more processor "cores."

Various embodiments are described in terms of this example computer system 600. After reading this description, it will become apparent to a person skilled in the relevant art how to implement the embodiments using other computer systems and/or computer architectures. Although some operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, processor device 604 may be a single processor in a multi-core/multiprocessor system, such system may be operating alone, or in a cluster of computing devices operating in a cluster or server farm. Processor device 604 is connected to a communication infrastructure 606, for example, a bus, message queue, network, or multi-core message-passing scheme.

Computer system 600 also includes a main memory 608, for example, random access memory (RAM), and may also include a secondary memory 610. Main memory may include any kind of tangible memory. Secondary memory 610 may include, for example, a hard disk drive 612, removable storage drive 614. Removable storage drive 614 may comprise a floppy disk drive, a magnetic tape drive, an optical disk drive, a flash memory, or the like. The removable storage drive 614 reads from and/or writes to a removable storage unit 618 in a well-known manner. Removable storage unit 618 may include a floppy disk, magnetic tape, optical disk, etc. which is read by and written to by removable storage drive 614. As will be appreciated by persons skilled in the relevant art, removable storage unit 618 includes a computer readable storage medium having stored therein computer software and/or data.

Computer system 600 (optionally) includes a display interface 602 (which can include input and output devices such as keyboards, mice, etc.) that forwards graphics, text, and other data from communication infrastructure 606 (or from a frame buffer not shown) for display on display unit 630.

In alternative implementations, secondary memory 610 may include other similar I/O ways for allowing computer programs or other instructions to be loaded into computer system 600. Such as a removable storage unit 622 and an interface 620. Examples may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Communications interface 624 may include a modem, a network interface (such as an Ethernet card), a communications port, a PCMCIA slot and card, or the like. Software and data transferred via communications interface 624 may be in the form of non-storage signals, which may be electronic, electromagnetic, optical, or other signals capable of being received by communications interface 624. These signals may be provided to communications interface 624 via a communications path 626. Communications path 626 carries signals and may be implemented using wire or cable, fiber optics, a phone line, a cellular phone link, an RF link or other communications channels.

In this document, the terms "computer storage medium" and "computer readable storage medium" are used to generally refer to media such as removable storage unit 618, removable storage unit 622, and a hard disk installed in hard disk drive 612. Such medium includes non-transitory storage mediums. Computer storage medium and computer readable storage medium may also refer to memories, such as main memory 608 and secondary memory 610, which may be memory semiconductors (e.g. DRAMs, etc.).

Computer programs (also called computer control logic) are stored in main memory 608 and/or secondary memory 610. Computer programs may also be received via communications interface 624. Such computer programs, when executed, enable computer system 600 to implement embodiments as discussed herein. Where the embodiments are implemented using software, the software may be stored in a computer program product and loaded into computer system 600 using removable storage drive 614, interface 620, and hard disk drive 612, or communications interface 624.

Embodiments also may be directed to computer program products comprising software stored on any computer readable medium. Such software, when executed in one or more data processing device, causes a data processing device(s) to operate as described herein. Embodiments may employ any computer readable storage medium. Examples of computer readable storage mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The Summary and Abstract sections may set forth one or more but not all exemplary embodiments contemplated, and thus, are not intended to limit the described embodiments or the appended claims in any way.

Various embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept as described herein. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the embodiments should not be limited by any of the above-described examples, but should be defined only in accordance with the following claims and their equivalents.

What is claimed is:

1. In at least one computer having at least one processor and one memory, a computer-implemented method, performed by the at least one processor, comprising:
   receiving an electronic presentation including a background object and a foreground object;
   receiving, over a network, a real-time video of a presenter for display within the electronic presentation, the real-time video including an opaque representation of the presenter and a translucent representation of the presenter;
   compositing a layered presentation including the background object composited behind the opaque representation of the presenter composited behind the foreground object composited behind the translucent representation of the presenter, wherein during an overlap between the presenter and the electronic presentation during a rendering of the layered presentation, the translucent representation of the presenter is visible ahead of the foreground object which is visible ahead of the opaque representation of the presenter which is visible ahead of the background object; and
   providing, in real-time, the layered presentation for rendering.

2. The method of claim 1, wherein the receiving a real-time video comprises:
   receiving data including RGB values corresponding to the opaque representation of the presenter, wherein the RGB values are used to composite the opaque representation of the presenter with the layered presentation.

3. The method of claim 2, further comprising:
   determining, from the data, alpha channel values corresponding to the translucent representation of the presenter, wherein the alpha channel values are used to composite the translucent representation of the presenter with the layered presentation.

4. The method of claim 3, further comprising:
   determining that the data is a composite file; and
   deconstructing the composite file to determine the RGB values and alpha channel values.

5. The method of claim 2, further comprising:
   determining depth information corresponding to the opaque representation of the presenter from the data.

6. The method of claim 3, wherein the receiving data comprises:
   receiving the data over a network as a single stream, wherein the data is composited to include both the RGB values and the alpha channel values.

7. The method of claim 1, further comprising:
receiving, over the network, a function corresponding to a gesture performed by the presenter, wherein the function is associated with changing the rendering of the electronic presentation; and
implementing the received function corresponding to the gesture on the electronic presentation, wherein the change is reflected via the rendering of the layered presentation.

8. The method of claim 7, further comprising:
providing an acknowledgment to the server indicating the function has been implemented.

9. In at least one computer having at least one processor and one memory, a computer-implemented method, performed by the at least one processor, comprising:
receiving a real-time video of a presenter interacting with an electronic presentation, the electronic presentation including a background object and a foreground object;
determining, from the video, presentation values for rendering an opaque representation of the presenter and a translucent representation of the presenter;
compositing the presentation values for rendering the opaque representation of the presenter with the presentation values for rendering the translucent representation of the presenter into a composite file; and
providing the composite file over a network for rendering the presenter on a remote device in association with the electronic presentation, wherein during an overlap during a rendering of the presenter with the electronic presentation, the translucent representation is visible ahead of the foreground object which is visible ahead of the opaque representation which is visible ahead of the background object.

10. The method of claim 9, wherein the compressing comprises:
generating a first image file including RGB values corresponding to rendering the opaque representation.

11. The method of claim 10, further comprising:
generating a shell of the first image file including alpha channel values corresponding to rendering the translucent representation, wherein the shell does not include the RGB values.

12. The method of claim 11, wherein the compressing comprises:
compressing the first image file and the shell into the composite file.

13. The method of claim 9, further comprising:
detecting a gesture by the presenter in the real-time video;
determining that the gesture corresponds to a function associated with changing a rendering of the electronic presentation; and
providing the function corresponding to the gesture over the network to the remote device.

14. The method of claim 13, further comprising:
receiving an acknowledgement over the network from the remote device that the rendering of the electronic presentation has been changed based on the function.

15. The method of claim 9, wherein the receiving comprises:
receiving a RGB image file and a depth image file corresponding to the video; and
producing a new image file based on the RGB image file and the depth image file, the new image file including alpha values.

16. A system, comprising:
a receiver configured to receive a real-time video, from a camera, of a presenter interacting with an electronic presentation, the electronic presentation including a background object and a foreground object;
a video processor configured to determine presentation values corresponding to rendering an opaque representation of the presenter and a translucent representation of the presenter from the video;
a gesture detector configured to determine that a gesture performed by the presenter in the video corresponds to a function associated with changing the electronic presentation;
a constructor configured to composite a first image file including the presentation values corresponding to rendering the opaque representation of the presenter and a shell of the first image file including the presentation values corresponding to rendering the translucent representation of the presenter into a composite file; and
a transmitter configured to transmit the composite file and any determined functions to a remote device,
wherein the remote device is configured to render a layered presentation including the translucent representation composited in front of the foreground object composited in front of the opaque representation composited in front of the background object, and
wherein the remote device is further configured to change the electronic presentation based on the determined function, wherein the layered presentation includes the changed electronic presentation.

17. The system of claim 16, wherein the remote device is further configured to deconstruct the composite file to determine the first image file and the shell.

18. The system of claim 16, wherein the transmitter is configured to receive an acknowledgement that the remote device has rendered the changed electronic presentation.

19. The system of claim 16, wherein the gesture detector is configured to determine that a hand gesture by the presenter corresponds to the function.

20. The system of claim 16, wherein the transmitter is configured to transmit a plurality of composite files in real-time corresponding to the real-time video.

21. The system of claim 16, wherein the transmitter is configured to transmit the composite file to a plurality of remote devices over the network.

* * * * *